United States Patent
Jang et al.

(10) Patent No.: US 7,899,260 B2
(45) Date of Patent: Mar. 1, 2011

(54) METHOD AND APPARATUS FOR GENERATING THUMBNAIL OF DIGITAL IMAGE

(75) Inventors: So-hee Jang, Seoul (KR); Yong-sung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1209 days.

(21) Appl. No.: 11/517,408

(22) Filed: Sep. 8, 2006

(65) Prior Publication Data

US 2007/0058872 A1    Mar. 15, 2007

(30) Foreign Application Priority Data

Sep. 10, 2005    (KR) ........................ 10-2005-0084418

(51) Int. Cl.
*G06K 9/36*    (2006.01)

(52) U.S. Cl. ........................................ 382/233; 382/232

(58) Field of Classification Search ................. 382/232, 382/233, 235, 282, 298, 299, 305; 358/1.2, 358/1.15, 426.06; 348/451, 239; 345/660; 715/835

See application file for complete search history.

(56) References Cited

U.S. PATENT DOCUMENTS

| | | | | |
|---|---|---|---|---|
| 5,706,457 A | * | 1/1998 | Dwyer et al. | 715/835 |
| 5,973,734 A | * | 10/1999 | Anderson | 348/239 |
| 2003/0090497 A1 | * | 5/2003 | Yoshioka | 345/660 |
| 2005/0123205 A1 | * | 6/2005 | Son et al. | 382/233 |

FOREIGN PATENT DOCUMENTS

| | | |
|---|---|---|
| CN | 1450825 | 10/2003 |
| CN | 1182472 C | 12/2004 |
| CN | 1625184 A | 6/2005 |
| EP | 1355270 A2 | 10/2003 |
| JP | 2003-189220 A | 7/2003 |
| KR | 10-2001-0205198 A | 11/2001 |
| KR | 10-2003-0091134 A | 12/2003 |

OTHER PUBLICATIONS

Kang, "Visualization Methods for Personal Photo Collections: Browsing and Searching in the PhotoFinder", IEEE ICME 2000, Aug. 2, 2000, vol. 3, pp. 1539-1542.*

* cited by examiner

*Primary Examiner* — Duy M Dang
(74) *Attorney, Agent, or Firm* — Sughrue Mion, PLLC

(57) ABSTRACT

A method and apparatus for generating a thumbnail in a size requested by an application at high definition and high speed to browse a digital image are provided. An original image is partially decoded to generate a first thumbnail and the first thumbnail is partially decoded to generate a second thumbnail in a size requested by an application. Accordingly, a digital image is displayed on a full screen using a stored thumbnail instead of decoding an original image, and therefore, a large-capacity high-definition image can be displayed quickly. In addition, to display a thumbnail in various sizes, a small size of the thumbnail is not enlarged but the thumbnail having a size approximate to a full screen size is reduced. Accordingly, degradation of picture quality is decreased.

14 Claims, 6 Drawing Sheets

FIG. 2

| DC | AC | AC | AC | AC | AC | AC | AC |
|----|----|----|----|----|----|----|----|
| AC | AC | AC | AC | AC | AC | AC | AC |
| AC | AC | AC | AC | AC | AC | AC | AC |
| AC | AC | AC | AC | AC | AC | AC | AC |
| AC | AC | AC | AC | AC | AC | AC | AC |
| AC | AC | AC | AC | AC | AC | AC | AC |
| AC | AC | AC | AC | AC | AC | AC | AC |
| AC | AC | AC | AC | AC | AC | AC | AC |

FIG. 3

| (DC) | (AC) | AC | AC | AC | AC | AC | AC |
|------|------|----|----|----|----|----|----|
| (AC) | (AC) | AC | AC | AC | AC | AC | AC |
| AC | AC | AC | AC | AC | AC | AC | AC |
| AC | AC | AC | AC | AC | AC | AC | AC |
| AC | AC | AC | AC | AC | AC | AC | AC |
| AC | AC | AC | AC | AC | AC | AC | AC |
| AC | AC | AC | AC | AC | AC | AC | AC |
| AC | AC | AC | AC | AC | AC | AC | AC |

METHOD AND APPARATUS FOR GENERATING THUMBNAIL OF DIGITAL IMAGE

CROSS-REFERENCE TO RELATED PATENT APPLICATIONS

This application claims priority from Korean Patent Application No. 10-2005-0084418, filed on Sep. 10, 2005, in the Korean Intellectual Property Office, the disclosure of which is incorporated herein in its entirety by reference.

BACKGROUND OF THE INVENTION

1. Field of the Invention

The present invention relates to a method and apparatus for generating a thumbnail of a digital image, and more particularly, to a method and apparatus for generating a thumbnail in a size requested by an application at high definition and high speed to browse a digital image.

2. Description of the Related Art

Recently, digital still camera (DSC) photos with a high resolution of 4 to 8 million pixels have become widespread and equipment such as a personal video recorder (PVR), a home audio/video (AV) center, and a portable multimedia player (PMP) having a large capacity of a storage device can perform a photo album function.

Such equipment has a large storage capacity but has a low central processing unit (CPU) power and thus cannot efficiently process a large-capacity high-definition digital image. Accordingly, to maximize efficiency of the limited CPU power, a thumbnail of the large-capacity high-definition digital image is generated and stored when the large-capacity high-definition digital image is stored in a storage device. During browsing, the thumbnail is displayed but not the original image. In a full-view mode, the original image is displayed.

In the conventional method, the thumbnail has a minimum size needed for browsing and is stored in an RGB format to reduce a decoding time when it is displayed.

In the conventional method, when the original image is used to view a full image regardless of the size of a display apparatus, the large-capacity high-definition original image needs to be decoded even if the entire original image cannot be displayed on a screen of the display apparatus. As a result, image displaying time increases. For example, while an 8 million pixel image has a size of 3400×2300 pixels, a television (TV) usually has a very low resolution of about 960×540 pixels. Accordingly, it is inefficient to decode and display an original image when the 8 million pixel image is reproduced in the TV, because the entire 8 million pixel image cannot be displayed on the TV.

Meanwhile, when images in an application are browsed, various sizes of thumbnails may be needed. When a thumbnail stored in a small size is enlarged to a larger size, picture quality decreases and display speed is slow.

As described above, in the conventional method of generating a thumbnail, it is inefficient and difficult to browse and display a large-capacity high-definition image in a short time with a low CPU power in an application requiring various sizes of thumbnails.

SUMMARY OF THE INVENTION

An aspect of the present invention is to provide a method and apparatus for generating an optimal thumbnail for efficient browsing considering a low central processing unit (CPU) power and extracting and displaying an image of a desired size.

According to an aspect of the present invention, there is provided a method of generating a thumbnail. The method includes the operations of generating a first thumbnail of an original image, encoding the first thumbnail, and decoding the encoded first thumbnail according to a request of an application to generate a second thumbnail of the original image.

The operation of generating the first thumbnail may include the operations of determining a size of a portion to be decoded in the original image based on a screen size of a display apparatus, and decoding the original image according to the determined size to generate the first thumbnail. The operation of determining the size may include determining, as the size of the portion to be decoded, a value most approximate to the screen size of the display apparatus among sizes of images that can be generated by partially decoding the original image and may include determining to decode the original image entirely when a size of the original image is smaller than or equal to the screen size of the display apparatus.

The operation of decoding the encoded first thumbnail may include the operations of receiving a request for an image from the application, determining a size of a portion to be decoded in the encoded first thumbnail according to the request, and decoding the encoded first thumbnail according to the determined size. The operation of determining the size may include determining as the size of the portion to be decoded a size most approximate to the requested image size among sizes of thumbnails that can be generated by partially decoding the encoded first thumbnail, and may include determining to decode the encoded first thumbnail entirely when a size of the first thumbnail is more approximate to the requested image size than any other sizes that can be generated by partially decoding the encoded first thumbnail. The method may further include scaling the second thumbnail.

According to another aspect of the present invention, there is provided a computer readable recording medium for recording a program for executing the method of generating a thumbnail.

According to still another aspect of the present invention, there is provided an apparatus for generating a thumbnail. The apparatus includes a determiner which determines a size of a portion to be decoded in an original image according to a screen size of a display apparatus to determine a size of a first thumbnail with respect to the original image and which determines a size of a portion to be decoded in the encoded first thumbnail according to an image request from an application; and a decoder which decodes the original image according to the determination of the determiner, thereby generating the first thumbnail, and which decodes the encoded first thumbnail according to the determination of the determiner, thereby generating a second thumbnail with respect to the original image.

BRIEF DESCRIPTION OF EXEMPLARY EMBODIMENTS OF THE DRAWINGS

The above and other aspects of the present invention will become more apparent by describing in detail exemplary embodiments thereof with reference to the attached drawings in which:

FIG. 2 illustrates a case where a direct current (DC) component is selected from a discrete cosine transformed image for ⅛ partial decoding, according to an exemplary embodiment of the present invention;

FIG. 3 illustrates a case where a DC component and an alternating current (AC) component are selected from a discrete cosine transformed image for ⅖ partial decoding, according to another exemplary embodiment of the present invention;

DETAILED DESCRIPTION OF THE INVENTION

Figure 1:
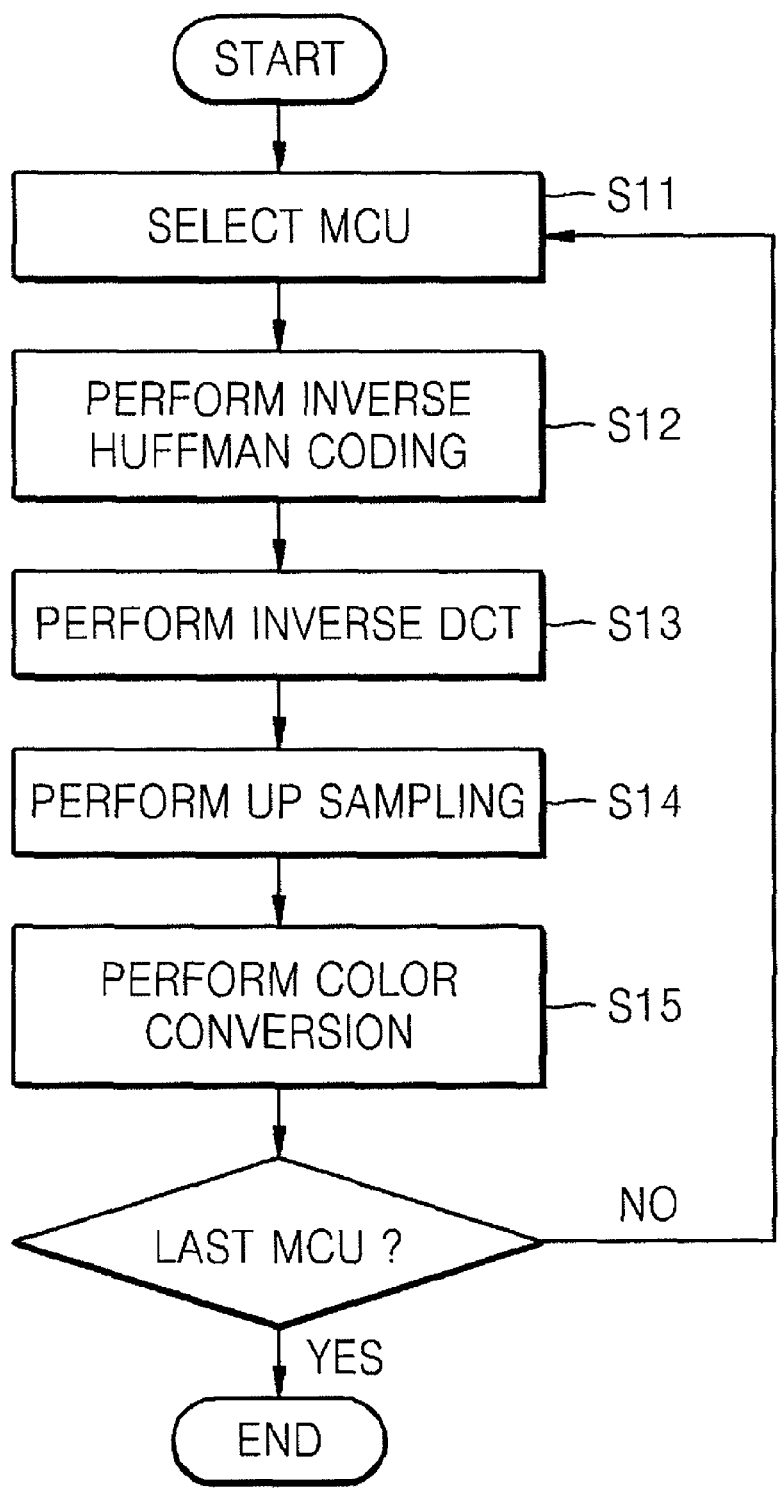
FIG. 1 is a flowchart of a procedure of decoding a Joint Photographic Experts Group (JPEG) image.

FIG. 1 is a flowchart of a procedure of decoding a Joint Photographic Experts Group (JPEG) image. A plurality of minimum coded units (MCUs) are present according to a size of a JPEG image. In operation S11, an MCU is selected. In operation S12, inverse huffman coding is performed with respect to the selected MCU in a way which is reverse to that performed when JPEG image was encoded. In operation S13, inverse discrete cosine transform (DCT) is performed in a way which is reverse to that performed during the encoding of the JPEG image. In operation S14, up sampling is performed in a way which is reverse to down sampling performed during the encoding by discarding some chrominance signal values in I and Q signals. In operation S15, color conversion is performed such that a YIQ value is converted into an RGB value.

The inverse DCT and the color conversion each take 30% and both together take 60% of central processing unit (CPU) time in the decoding of a full image. Accordingly, time taken for the inverse DCT and the color conversion is proportional to the number of pixels in the image. Therefore, when the number of pixels in an input image is reduced, time taken for image decoding can be remarkably reduced. Considering this fact, the present invention provides partial decoding in which the number of input pixels is reduced in the inverse DCT and the color conversion to extract a thumbnail from an original image and an image is extracted in a size desired by an application from the thumbnail, thereby remarkably reducing a total decoding time compared to when the entire original image is decoded.

In the inverse DCT, an input value is generally a result of dividing an entire image into 8×8 blocks according to a JPEG encoding method and performing DCT on each block. The result, as shown in FIG. 2, has a single direct current (DC) component and a plurality of alternating current (AC) components occupying remaining blocks. Since the DC component contains a major component of each block, when the inverse DCT is performed on all of the blocks using only the DC component of each block, an image comprised of mean components of the individual blocks is extracted. The image extracted using only the DC component is ⅛ of the size of an original image. Similarly, when the inverse DCT is performed using n×n DC components and AC components, an extracted image is N/8 of the size of the original image.

For example, referring to FIG. 3, one DC component and three AC components are selected to extract an image that is ⅖ of the size of an original image.

Figure 4:
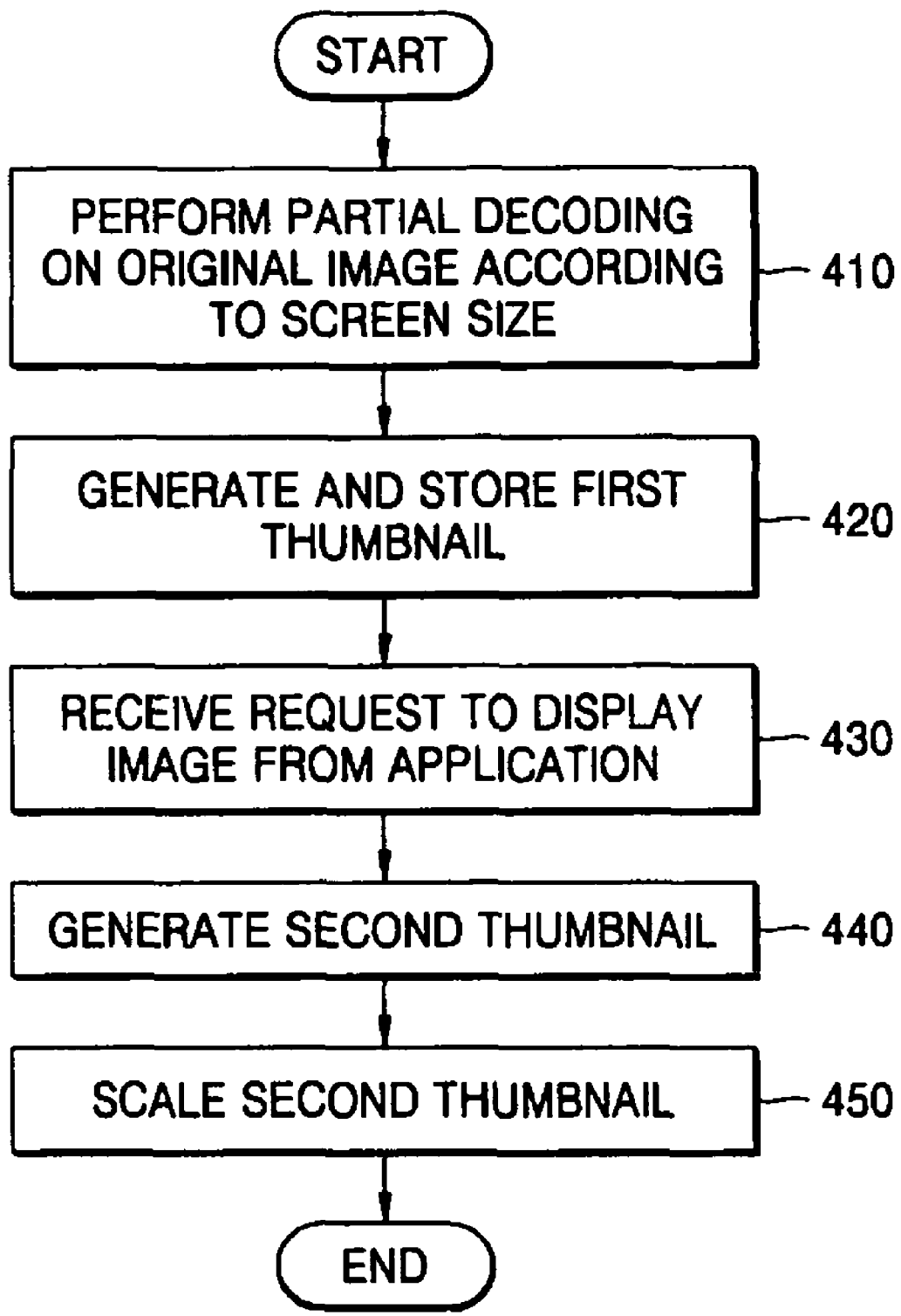
FIG. 4 is a schematic flowchart of a procedure of generating a thumbnail from an original image according to an exemplary embodiment of the present invention.

FIG. 4 is a schematic flowchart of a procedure of generating a thumbnail from an original image according to an exemplary embodiment of the present invention.

When an original image is input, partial decoding is performed on the original image according to a screen size of a display apparatus in operation 410. A first thumbnail is generated from the partial-decoded image and stored with respect to the original image in operation 420. Here, the first thumbnail may be compressed using Low Quality JPEG, which will be described later, when it is stored. When an application of the display apparatus requests a particular size of a thumbnail image in operation 430, an image of the requested size is extracted from the first thumbnail not from the original image to generate a second thumbnail in operation 440. The second thumbnail is scaled in operation 450 and then displayed. When the second thumbnail is generated, partial decoding may be used, which will be described in detail later.

Figure 5:
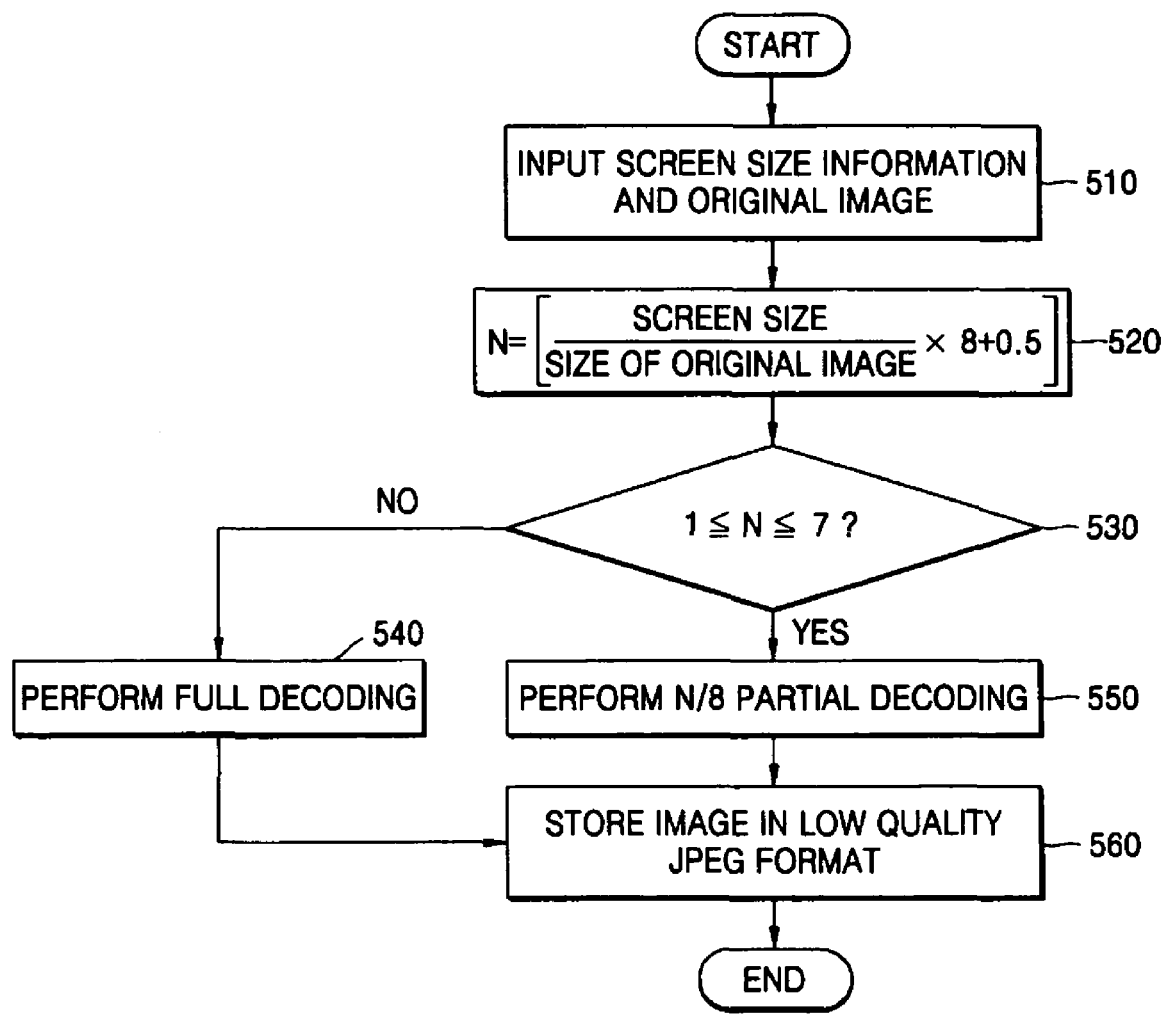
FIG. 5 is a flowchart of a procedure of generating a first thumbnail according to an exemplary embodiment of the present invention.

FIG. 5 is a flowchart of a procedure of generating a first thumbnail according to an exemplary embodiment of the present invention. In the exemplary embodiment of the present invention, the maximum size of an original image is 8 times greater than the screen size of a display apparatus.

When information on the screen size of the display apparatus and an original (digital) image are input in operation 510, a size of a portion to be decoded in the original image, i.e., a size of a first thumbnail is determined based on the input information in operation 520. For example, when an 8 million pixel image is displayed on a TV having a full screen resolution of ¼ of the 8 million pixel image, the original image is not decoded, but the first thumbnail of the original image is displayed even in a full-view mode, thereby reducing a display speed. In addition, when an application requests a smaller-size image than the first thumbnail, the first thumbnail may be partially decoded or reduced to generate a second thumbnail, which is displayed, to increase picture quality and display speed.

Accordingly, the size of the first thumbnail may be determined to most approximate to the screen size or a number of pixels of the display apparatus. When a Gauss operation is performed in operation 520, 0.5 is added to obtain a value N most approximate to the screen size of the display apparatus which will use the size of a portion to be partially decoded. The size of the portion to be partially decoded is determined according to the value N such that a first thumbnail having a size most approximate to the screen size of the display apparatus is generated in operation 530. In operation 550, N/8 of the original image is decoded. For example, when the original image is a 6 million pixel image having a resolution of 3008×2000 pixels and the screen size is 960×540 pixels, the value N will be 2 and ⅖ partial decoding will be performed, thereby extracting a 752×500-pixel first thumbnail. Meanwhile, when the size of the original image is smaller than or equal to the screen size of the display apparatus, that is, when the value N is greater than 8, partial decoding is not performed but the original image is decoded entirely in operation 540. In addition, when the size of the original image is more approximate to the screen size of the display apparatus than the sizes of any other images that can be generated using partial decoding, full decoding instead of partial decoding is performed in operation 540.

In the exemplary embodiment illustrated in FIG. 5, the first thumbnail is ⅛ to ⅞ of the size of the original image. However, first thumbnails that are 1/16 and 1/32 of the size of the original image may be obtained by sampling DC components of the original image in units of blocks.

The first thumbnail generated in such way is decoded and stored in a Low Quality JPEG format, which compresses the original image to a 1/20 to 1/30 of an original capacity, in operation 560. As for an RGB format in which a thumbnail is usually stored, since an image cannot be compressed, a large disc space is occupied and an overhead for file reading is very large when the image is displayed. When a High Quality JPEG format that compresses an RGB format image to 1/6 is used, picture quality is secured, but a compression rate notably decreases when the size of a thumbnail decreases. For these reasons, the Low Quality JPEG format is selected. The Low Quality JPEG format has a higher compression rate than the above-described formats and provides picture quality that is just slightly different to human sight than the High Quality JPEG format. Accordingly, the Low Quality JPEG format is more suitable to high-speed display and display in various sizes.

Figure 6:
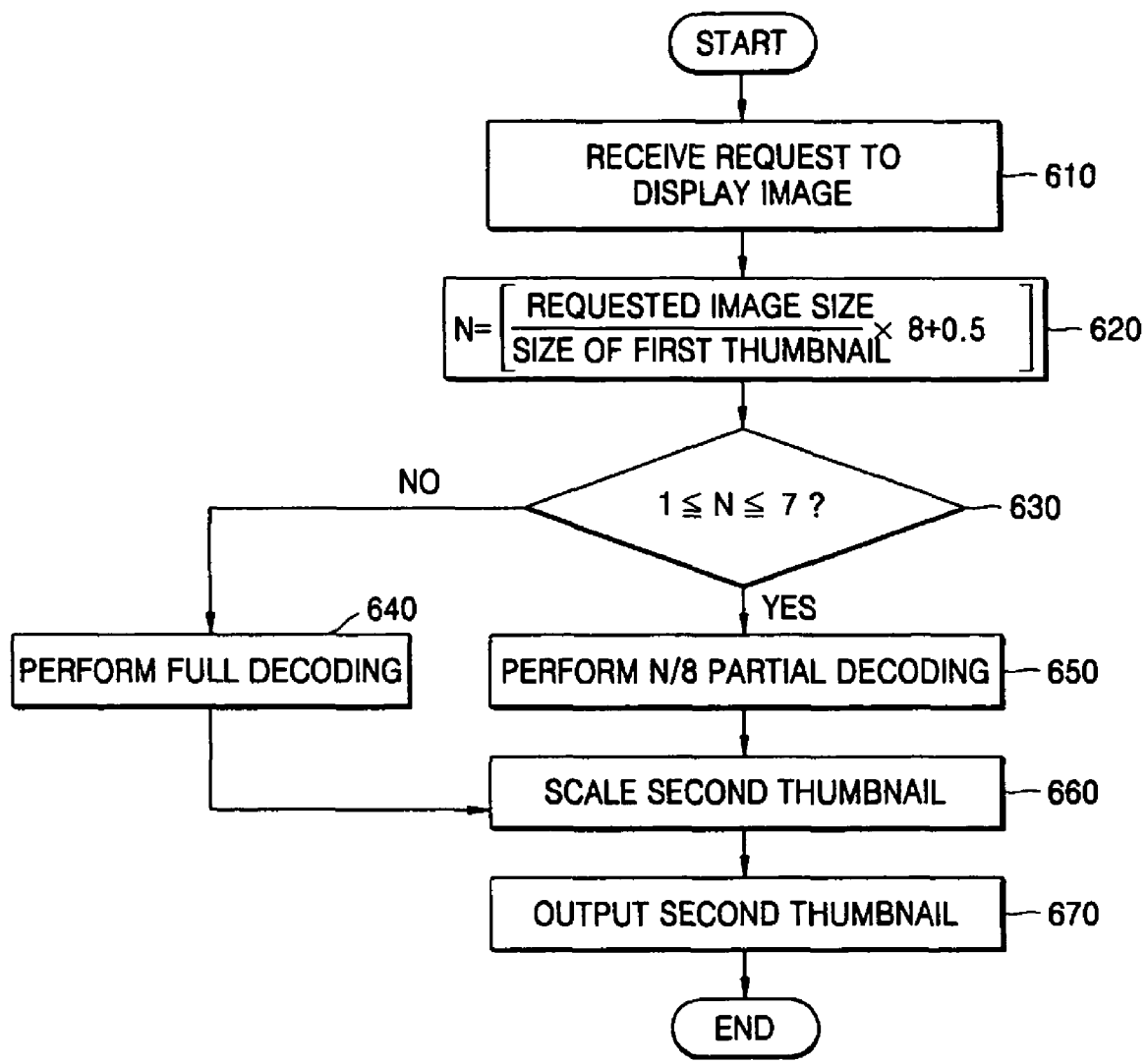
FIG. 6 is a flowchart of a procedure of generating a second thumbnail from the first thumbnail according to an exemplary embodiment of the present invention.

FIG. 6 is a flowchart of a procedure of generating a second thumbnail from a first thumbnail according to an exemplary embodiment of the present invention. After the first thumbnail is encoded and stored through the procedure illustrated in FIG. 5, when an application such as a photo album requests a particular size of an image for browsing in operation 610, a size of a portion to be decoded in the first thumbnail, i.e., the size of the second thumbnail is determined based on the size of the first thumbnail and the size requested by the application in operations 620 and 630. The image size requested by the application may be a size for various preview modes or a full screen size. The size of the portion to be decoded may be determined to be most approximate to the requested image size. In other words, as much of the portion of the first thumbnail as a size most approximate to the requested image size is decoded in operation 650. If the size of the first thumbnail is smaller than or equal to the requested image size or is more approximate to the requested image size than the sizes of any other images that can be generated using partial decoding, the first thumbnail is entirely decoded to generate the second thumbnail in operation 640. Meanwhile, the second thumbnail generated by entirely or partially decoding the first thumbnail may not have exactly the same size as the requested image size. To make the second thumbnail having a size more approximate to the requested image size, the second thumbnail is scaled in operation 660 and then output in operation 670.

Figure 7:
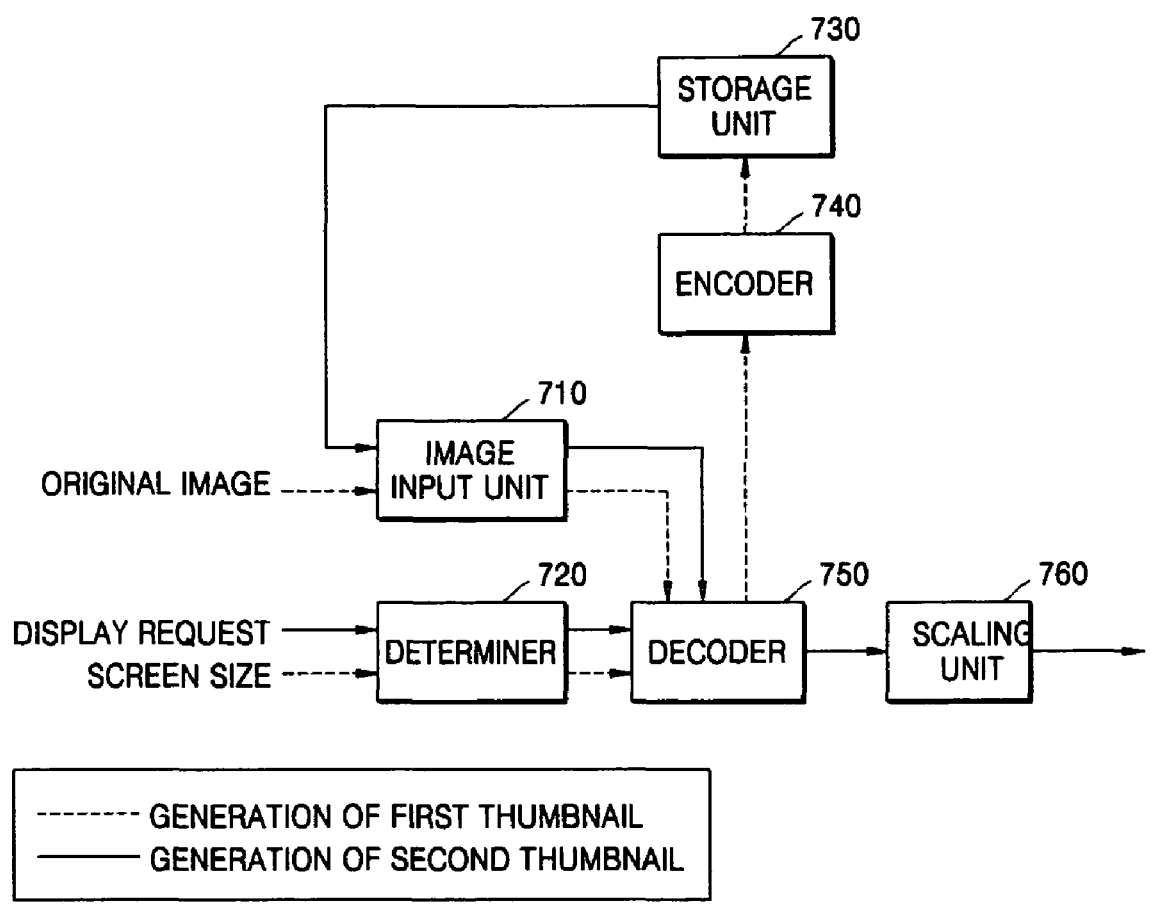
FIG. 7 illustrates an apparatus for generating a thumbnail according to an exemplary embodiment of the present invention.

FIG. 7 illustrates an apparatus for generating a thumbnail according to an exemplary embodiment of the present invention. Referring to FIG. 7, the apparatus includes an image input unit 710, a determiner 720, a storage unit 730, an encoder 740, a decoder 750, and a scaling unit 760. In the drawing, dotted lines indicate information flow in a procedure of generating a thumbnail and solid lines indicate information flow in a procedure of displaying the thumbnail.

Hereinafter, a procedure of generating a first thumbnail and a procedure of generating a second thumbnail will be sequentially described together with the functions of the individual elements in the apparatus shown in FIG. 7

In the procedure of generating a first thumbnail, the image input unit 710 receives an original image and the determiner 720 receives information on a screen size of a display apparatus. The determiner 720 determines a size of the first thumbnail, i.e., a size of a portion to be decoded in the original image based on the information on the screen size of the display apparatus. The decoder 750 decodes the original image entirely or partially according to the determination of the determiner 720, thereby generating the first thumbnail. The encoder 740 encodes the first thumbnail generated by the decoder 750 in a Low Quality JPEG format. The storage unit 730 stores the encoded first thumbnail, which completes the procedure of generating a (first) thumbnail.

The following describes the functions of the individual elements in the apparatus for generating a thumbnail by explaining a procedure of generating a second thumbnail.

When the determiner 720 receives a request for a particular size of a particular image from an application, it determines a size of a portion to be decoded in a first thumbnail stored in the storage unit 730. The decoder 750 decodes the first thumbnail extracted from the storage unit 730 and received through the image input unit 710 according to the determination of the determiner 720, thereby generating a second thumbnail. As described above, the decoding may be full decoding or partial decoding. Before the second thumbnail generated by the decoder 750 is output, it may be enlarged or reduced by the scaling unit 760 to be approximate to the requested particular size.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

According to the present invention, a digital image is displayed on a full screen using a stored thumbnail instead of decoding an original image, and therefore, a large-capacity high-definition image can be displayed quickly. In addition, to display a thumbnail in various sizes, a small size of the thumbnail is not enlarged but the thumbnail having a size approximate to a full screen size is reduced. Accordingly, degradation of picture quality is decreased so that an image can be searched and played in various sizes within a short time. Accordingly, the present invention can be applied to equipment having a large storage capacity but having a low CPU power to increase users' convenience.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method for generating a thumbnail, the method comprising:
   with an image processing apparatus:
   generating a first thumbnail of an original image by partially decoding the original image;
   encoding the first thumbnail;
   determining a size of a second thumbnail to be used in an application according to an image request from the application; and
   generating the second thumbnail of the original image by decoding the encoded first thumbnail based on the determined size.

2. The method of claim 1, wherein the generating of the first thumbnail comprises:

determining a size of the first thumbnail based on a screen size of a display apparatus; and decoding the original image according to the determined size to generate the first thumbnail.

3. The method of claim 2, wherein the determining of the size of the first thumbnail comprises determining, as the size of the first thumbnail, a value most approximate to the screen size of the display apparatus among sizes of images that can be generated by partially decoding the original image.

4. The method of claim 1, wherein the encoding of the first thumbnail comprises encoding the first thumbnail in a Joint Photographic Experts Group (JPEG) format so that a capacity of the first thumbnail is reduced to 1/20 through 1/30 of the original image.

5. The method of claim 1, wherein the determining of the size of the second thumbnail comprises determining, as the size of the second thumbnail, a size most approximate to the requested image size among sizes of thumbnails that can be generated by partially decoding the encoded first thumbnail.

6. The method of claim 1, wherein the determining of the size of the second thumbnail comprises determining to decode the encoded first thumbnail entirely if a size of the first thumbnail is more approximate to the requested image size than any other sizes that can be generated by partially decoding the encoded first thumbnail.

7. The method of claim 1, further comprising scaling the second thumbnail.

8. A non-transitory computer readable recording medium comprising a computer program recorded thereon for executing a method of generating a thumbnail, the method comprising:

generating a first thumbnail of an original image by partially decoding the original image;

encoding the first thumbnail;

determining a size of a second thumbnail to be used in an application according to an image request from the application; and generating the second thumbnail of the original image by decoding the encoded first thumbnail based on the determined size.

9. An apparatus for generating a thumbnail, the apparatus comprising:

an image processor which comprises:

a determiner which determines a size of a first thumbnail of an original image and which determines a size of a second thumbnail of the original image according to an image request from an application;

a decoder which partially decodes the original image according to the determination of the determiner to generate the first thumbnail, and which decodes the encoded first thumbnail according to the determination of the determiner to generate the second thumbnail; and an encoder which encodes the first thumbnail generated by the decoder.

10. The apparatus of claim 9, wherein the determiner determines as the size of the first thumbnail a value most approximate to a screen size of a display apparatus among sizes of images that can be generated by partially decoding the original image.

11. The apparatus of claim 9, wherein the determiner determines as the size of the second thumbnail a size most approximate to a size corresponding to the image request among sizes of thumbnails that can be generated by partially decoding the encoded first thumbnail.

12. The apparatus of claim 9, wherein the determiner determines to decode the encoded first thumbnail entirely if a size of the first thumbnail is more approximate to a size corresponding to the image request than any other sizes that can be generated by partially decoding the encoded first thumbnail.

13. The apparatus of claim 9, further comprising a scaling unit which scales the first thumbnail or the second thumbnail according to the determination of the determiner.

14. The apparatus of claim 9, wherein the encoder encodes the first thumbnail in a Joint Photographic Experts Group (JPEG) format to reduce a capacity of the first thumbnail to 1/20 through 1/30 of the original image.

* * * * *